(12) United States Patent
Kopetz et al.

(10) Patent No.: US 8,301,885 B2
(45) Date of Patent: Oct. 30, 2012

(54) TIME-CONTROLLED SECURE COMMUNICATION

(75) Inventors: Hermann Kopetz, Baden bei Wien (AT); Stefan Poledna, Klosterneuburg (AT)

(73) Assignee: FTS Computertechnik GmbH, Vienna (AT)

( * ) Notice: Subject to any disclaimer, the term of this patent is extended or adjusted under 35 U.S.C. 154(b) by 975 days.

(21) Appl. No.: 12/162,198

(22) PCT Filed: Jun. 30, 2006

(86) PCT No.: PCT/AT2006/000278
§ 371 (c)(1),
(2), (4) Date: Oct. 15, 2008

(87) PCT Pub. No.: WO2007/085028
PCT Pub. Date: Aug. 2, 2007

(65) Prior Publication Data
US 2009/0086763 A1    Apr. 2, 2009

(30) Foreign Application Priority Data

Jan. 27, 2006  (AT) .................................. A 125/2006
May 4, 2006   (AT) .................................. A 761/2006

(51) Int. Cl.
*H04L 9/32*        (2006.01)
(52) U.S. Cl. ........ 713/168; 713/150; 713/151; 713/152; 370/498; 370/464; 380/255
(58) Field of Classification Search ..................... 726/16; 370/498, 464; 380/255; 713/150, 151, 152, 713/168
See application file for complete search history.

(56) References Cited

U.S. PATENT DOCUMENTS

| 5,694,542 A | 12/1997 | Kopetz |
| 5,887,143 A | 3/1999 | Saito et al. |
| 7,564,865 B2 * | 7/2009 | Radulescu ................... 370/458 |
| 7,899,894 B2 * | 3/2011 | Carlson et al. ............... 709/223 |
| 2003/0007455 A1 * | 1/2003 | Kohzuki et al. ............ 370/230.1 |

(Continued)

FOREIGN PATENT DOCUMENTS

AT    407 582 B    8/2000

(Continued)

OTHER PUBLICATIONS

William J. Daily; Route Packets, Not Wires: On-Chip Interconnection Networks; IEEE; Date: Jun. 11, 2001; pp. 1-6.*

(Continued)

*Primary Examiner* — April Shan
(74) *Attorney, Agent, or Firm* — RatnerPrestia (57) ABSTRACT

A method for transmitting messages via a time-controlled communication system (ZK) between a number of IP cores is provided. Each IP core has an information-processing subsystem (IVS) and a network controller (NK). Each NK has at least two interfaces, one for the ZK and a one for the IVS, wherein a distinction is drawn between privileged and non-privileged messages of the ZK, and where the transmission parameters relating to the ZK of a port of the NK, such as the periodically recurring transmission time of a message and the maximum transmission duration after each transmission time, can be set by a privileged message via the ZK or directly by a privileged entity. Each NK intending to transmit a message starts to transmit the message autonomously exactly at the time of the next set transmission time and interrupts the transmission process no later than the assigned maximum transmission duration has elapsed.

40 Claims, 2 Drawing Sheets

U.S. PATENT DOCUMENTS

| | | | |
|---|---|---|---|
| 2005/0010676 A1* | 1/2005 | Venkatachalam et al. | 709/232 |
| 2005/0271054 A1* | 12/2005 | Kang et al. | 370/389 |
| 2007/0147379 A1* | 6/2007 | Lee et al. | 370/392 |
| 2008/0082621 A1* | 4/2008 | Han et al. | 709/211 |
| 2010/0202449 A1* | 8/2010 | Moscibroda et al. | 370/389 |

FOREIGN PATENT DOCUMENTS

| | | |
|---|---|---|
| AT | 408 383 B | 3/2001 |
| EP | 0 658 257 | 6/1995 |
| EP | 1 325 414 | 7/2003 |
| EP | 1 512 254 | 3/2005 |
| WO | WO 2005/099187 A1 | 10/2005 |

OTHER PUBLICATIONS

International Search Report for PCT International Application No. PCT/AT2006/000278, mailed Oct. 20, 2006.

* cited by examiner

$2^{-8}$ sec  $2^{-16}$ sec  $2^{-24}$ sec

TIME-CONTROLLED SECURE COMMUNICATION

This application is a U.S. National Phase Application of PCT International Application No. PCT/AT2006/000278, filed Jun. 30, 2006.

The invention relates to a method for transmitting messages via a time-controlled communication system (ZK) between a number of IP cores, with each IP core having an information-processing subsystem (IVS) and a network controller (NK), with each NK having at least two interfaces, an interface to the ZK and a second interface to the IVS. According to the invention, a distinction is drawn between privileged and non-privileged messages of the ZK, and the transmission parameters relating to the ZK of a port of the NK, such as the periodically recurring transmission time of a time-controlled message and the maximum transmission duration after each transmission time, can be set exclusively by a privileged message via the ZK or directly by a privileged entity (privileged IP core). Each NK which intends to transmit a message starts to transmit the message autonomously exactly at the time of the next transmission time and interrupts the transmission process at the latest after the assigned maximum transmission duration has elapsed.

BACKGROUND OF THE INVENTION

The technological advances in the area of the integration of transistors on a chip have resulted in a number of complete computers which exchange messages via an on-chip network being able to be realised on a single chip. An example for such a multi-computer chip is the cell chip [9] on which are integrated nine computers, each with a local memory of 256 Kbyte. It corresponds to the current state of the art that the on-chip communication network is executed as an incidence-controlled network between the on-chip computers. As non-plannable conflicts can result in an incidence-controlled network around the assignment of the on-chip communication channel to the on-chip computers, incidence-controlled networks are generally not deterministic.

BRIEF DESCRIPTION OF THE INVENTION

The aforementioned problem is solved in the present invention in that a deterministic time-controlled communication system is introduced as an on-chip network.

The present invention has the aim to design the communication between the on-chip computers which are realised on a SoC in a deterministic manner by the introduction of a time-controlled network. So as to achieve a good resource utilisation and the dynamic adaptation of the time-controlled on-chip network to dynamically changing requirements, it is suggested according to the invention to assign the function of an on-chip scheduler to a dedicated on-chip computer, the trusted network authority (TNA), which dynamically calculates conflict-free transmission parameters and assigns them dynamically to the other on-chip computers by the transfer of privileged secure messages. This dynamic method can also be used in a time-controlled communication system which connects a number of computer nodes.

Thereby, it is constructively ensured in each NK, that is, preferably via the hardware, that the transmission parameter of a port of an NK concerning the ZK can be set exclusively by a privileged message via the ZK or directly by a privileged entity (privileged IP core).

The following concrete and advantageous embodiments can additionally or alternatively be realised with the method according to the invention:

- the NKs are realised on a single system-on-chip (SoC) and the ZK is carried out as a network-on-chip;
- the NKs are realised on different chips and the ZK is carried out as an off-chip network;
- the distinction between a privileged an a non-privileged message of the ZK takes place on the basis of a designated bit in the header of each ZK message;
- the distinction between a privileged and a non-privileged message of the ZK takes place on the basis of the periodic transmission time of the message;
- a distinction is made between privileged and non-privileged transmission ports of the NK of an IP core, and a privileged message can only be transmitted via a privileged transmission port, where the distinction between a privileged and a non-privileged message takes place on the basis of the physical name of the privileged transmission port.

With further additional or alternative embodiments of the invention it is provided that

- every IP core comprises a physical name which labels the physical identity of this IP core, and further comprises one or several logical names which label the functions of the IP cores in the given use, and where the assignation of a logical name to an IP core can take place exclusively via a privileged message;
- the IVS of a non-privileged IP core can read the transmission parameters of its NK, but not change them;
- one of the privileged IP cores, the so-called trusted network authority (TNA) contains a scheduler which dynamically calculates the transmission parameters of all IP cores connected to the ZK in such a manner that every transmission process can run free of conflict, and where the TNA assigns the periodic transmission times and the transmission durations of all ports of the NKs to the IP cores by means of privileged messages via the ZK;
- the scheduler is removed from the TNA in a security-critical system and is moved into another IP core, and where the TNA carries out the checking of the transmission parameters calculated by the scheduler before these transmission parameters are transferred by means of privileged messages from the TNA to the other IP cores;
- the duration of the periods of the time-controlled messages in the ZK are powers of two of a smallest period;
- the period of the ZK corresponds exactly to the duration of a physical second;
- several independent ports of an IP core are supplied via a single physical communication channel of the ZK in the time division method;
- the calculation of the conflict-free transmission parameters is carried out within a time-controlled SoC by an off-chip entity and that the results of this calculation are sent to the affected time-controlled SoC via a data connection;
- the data on the data connection between the off-chip entity and the affected SoC are transferred in a coded manner;
- each IP core can send a message via the ZK to the privileged IP core containing the scheduler, so as to request a change of the assigned transmission times and the assigned transmission durations;
- one or more IP cores periodically transmit a vital sign message via the ZK to one or several of the privileged IP cores;

a privileged IP core can initiate the restart of the affected non-privileged IP core by the NK of this IP core during the absence of the vital sign message via the ZK;

one of the privileged IP cores undertakes a reconfiguration of the SoC during an absence of the vital sign message of an IP core by assigning the role of the failed IP core to the NK of another IP core via a privileged message of the ZK, and, if necessary, an i-state, which is necessary for the fulfilment of the new role is transferred to the IP core;

the NK autonomously transmits a diagnostics message when recognising an error by the NK;

the information-processing subsystem (IVS) of an IP core is either a programmable computer including the user software, a FPGA unit or a dedicated hardware unit;

the physical communication channel of the ZK recodes the transmission data in an error-correcting code, so that the transfer errors dominated by the error-correcting code can be recognised and corrected by the receiver;

several independent ports of an IP core are supplied via a single physical communication signal of the ZK in the time division method;

the ZK comprises two or several independent physical transfer channels, so that one or several further independent transfer channels are available during an outage of one transfer channel;

the dynamic scheduler optimises the schedules while considering the necessary time behaviour of the IP cores and the optimal energy consumption of the entire SoC;

the clock frequency of the ZK and the operating frequency of each single IP core are different;

the operating frequency of an IVS of an IP core can be changed dynamically by the scheduler via a privileged message of the ZK to the NK of this IP core, so as to ensure the timeliness of the results of the IP core and to optimise the energy consumption of the SoC;

in a designated bit in the header of every ZK message it is noted if the message is a periodic or sporadic time-controlled message, and where periodic messages are transmitted in every assigned period, and sporadic messages are only sent if the content of the message has changed since the last transmission process;

the information-processing subsystem (IVS) comprises a further local interface in addition to the interface to the NK, via which is realised a connection to an off-chip network or to an off-chip process periphery;

the information-processing subsystem (IVS) comprises a further local interface in addition to the interface to the NK, which supports a connection to another SoC corresponding to the TT ethernet protocol;

the global time of the TT ethernet protocol is used as time reference for the external synchronisation of the ZK;

the schedule calculated according to claim 9 by means of the scheduler is adjusted with the schedule of the TT Ethernet according to claim 30 in such a manner that a continuous data stream can flow with minimal latency from one IP core of this SoC to another IP core of another SoC;

one SOC supports several ports with the TT ethernet protocol, so as to tolerate the outage of a port or an external network;

it is ensured by means of cryptographic methods that the transmission times in the NKs can only be set or changed via coded messages by the IP cores authorised therefor.

The invention further relates to a system-on-chip (SoC) for carrying out such a method.

With a system-on-chip (SoC), on which are connected a plurality of IP cores via a time-controlled communication system, the time-controlled communication system (ZK) and the IP cores can belong to different clock domains and the clock domain crossing is respectively realised within one network controller NK assigned to an IP core in that an information-processing subsystem (IVS) of the IP core accesses within the stability intervals known a priori between the message transfer by the ZK to the message buffers which are present in the NK in a reading or writing manner.

It is advantageous if several independent ports of an IP core are supplied via a single physical communication signal of the ZK in the time division method.

It can also be convenient if the calculation of the conflict-free transmission parameters is carried out within a time-controlled SoC by an off-chip entity and that the results of this calculation are sent to the affected time-controlled SoC via a data connection.

The data on the data connection between the off-chip entity and the affected SoC can be transferred in a coded manner.

It can also be provided that each IP core can send a message via the ZK to the privileged IP core containing the scheduler, so as to request a change of the assigned transmission times and the assigned transmission durations.

BRIEF DESCRIPTION OF THE DRAWINGS

The above-described aim and other new characteristics of the present invention are explained in the mentioned drawings.

DETAILED DESCRIPTION

In the following paragraph, a possible implementation of a time-controlled on-chip network is shown with the example of a SoC with six IP cores.

Figure 1:
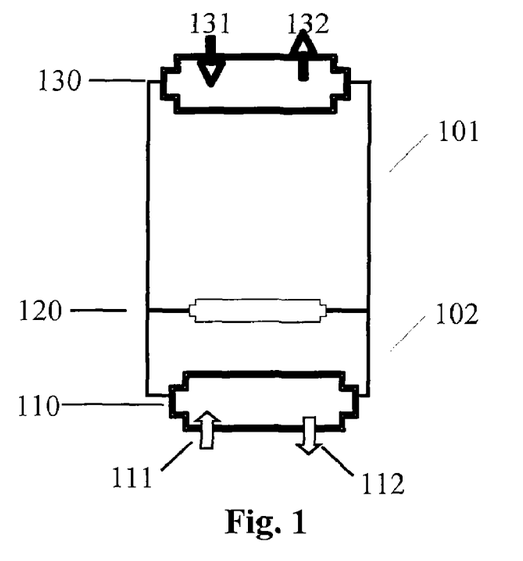
FIG. 1 shows the inner assembly of an information-processing unit, which is called IP core in the following.

FIG. 1 shows the assembly of an on-chip IP core. Such an IP core consists of an information-processing subsystem (IVS) 101 and an on-chip network controller (NK) 102. The IVS can be a microcomputer with the necessary system software and the necessary user software, or a FPGA subsystem or a dedicated hardware subsystem (state-machine). The IP core comprises two interfaces, one interface to the NK 120 and an optional second interface 130 to an external off-chip network or to an external process periphery. The interface 130 of FIG. 1 shows two ports, the entry port 131, via which messages can be received in a sequential manner and the exit port 132, via which messages can be sent sequentially. The NK comprises two interfaces, one interface 120 to the IVS and a second interface 110 to the time-controlled communication system (ZK). In FIG. 1, two ports to the ZK of the NK 102 are shown, a sequential entry port 111 and a sequential exit port 112. According to the invention, more than two ports of an NK 102 to the ZK 200 can be configured.

Figure 2:
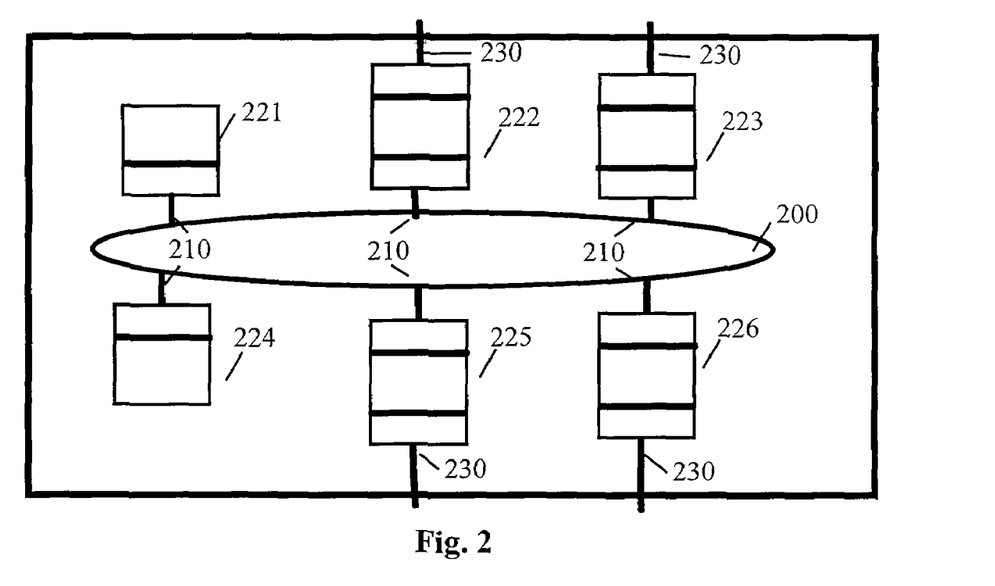
FIG. 2 shows the assembly of a system-on-chip (SoC), on which six on-chip IP cores communicate via a time-controlled network.

FIG. 2 shows the assembly of a time-controlled system-on-chip (SoC), on which are depicted six IP cores 221, 222, 223, 224, 225 and 226, which are connected to one another via a ZK 200. The IP cores are assembled as shown in FIG. 1. Each IP core supports a connection 210 to the ZK. Four of the IP cores, 222, 223, 225 and 226 support a further connection 230 to an external network or to the external process periphery. In accordance with the principles of the time control [9, p.171], [2,3,4,6], the IP cores coordinate their transmission operations at the ZK 200 in such a manner that there is never a conflict between two transmitted messages in the ZK 200. This coordination takes place via a common global time base corresponding to the time-division-multiple-access method. For this, it is necessary that e.g. one of the IP cores, e.g. 226, takes over the function of a central master of the clock synchronisation [1,5], so as to synchronise the local clocks in all NKs. So as to ensure the conflict freedom of the transmission operations, the planning of the transmission times and of the transmission durations is carried out centrally for the entire SoC in a special privileged Ip core, e.g. in the lp core 226. We call such an IP core 226 a trusted network authority (TNA). It is an essential characteristic of this invention that the transfer of these transmission times and transmission durations can take place from the privileged IF core 226, the TNA, to the NKs of the other IP cores only via privileged messages. It is therefore impossible for a non-privileged IP core to change the transmission time and the transmission duration of a message of the NK assigned thereto. By this essential characteristic of this invention, it is prevented that a software or hardware error in the information-processing subsystem (IVS) 101 of a non-privileged IP core can have an influence on the transmission time of its NK 102 and thereby indirectly on the data communication between the other IP cores. This important characteristic of the invention thus prevents the possibility of the error propagation of an error of an IVS in the time region to the other IP cores on the plane of the architecture. It is of course possible for the IVS 101 to read the present value of the transmission time and the transmission duration which was assigned to its NK 102 by the privileged IP core 226 (but it is not possible to change these values).

Figure 3:
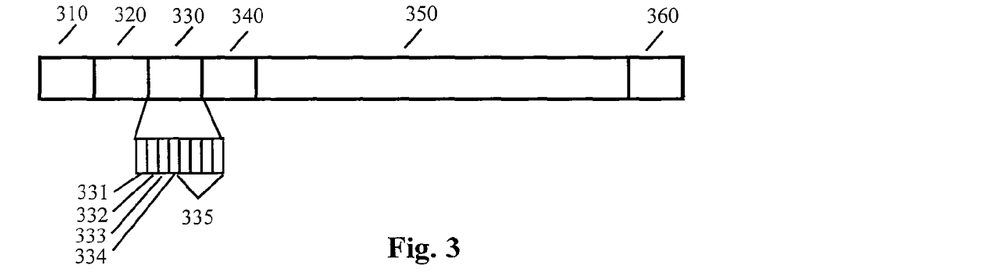
FIG. 3 shows the assembly of a message in the time-controlled communication system.

FIG. 3 shows a possible assembly of a message of the ZK. Each ZK message contains a transmission address field 310, into which is entered the name of the transmitting IP core. The address of the receiver of the message is entered into the field 320. If a message is to be transmitted to all IP cores which are connected to the ZK, a special address is present in the receiver field, e.g. no bit of 320 is set. The field 330 is a control field of the message. If bit 331 is set, the message is a privileged message, if bit 331 is not set, the message is not a privileged message. It has to be ensured in a hardware-technical manner that only a privileged IP core can send a privileged message (that is, set bit 331). Alternatively, a privileged message can be coded by cryptographic methods in such a manner that only the NK 102 can decode the message. If bit 332 of the control field 330 is set, the message address is a physical address and characterises the physical identity of the transmitting IP core. If bit 332 is not set, it is a logical address which characterises the role of the transmitter and receiver from the view of the software. If bit 333 is set, it is a periodic time-controlled message which is transferred in every period. If bit 333 is not set, it is a sporadic time-controlled message which is only transmitted if the message content has changed since the last transmission process. Bit 334 does not (yet) have any meaning. The four bits 335 inform about the length of a message, expressed in a multiple of the smallest message length. The name of the message is contained in the field 340. The message name makes the connection between the content of the message in field 350 and the syntactic structure and the meaning of this content. Finally, the optional field 360 is a CRC field for recognising transfer errors. The message content can also be recoded in an error-recognising code, so that transfer errors which are dominated by this code, are not only recognised, but can also be corrected at once.

According to the invention, the attributes cited in FIG. 3 can also be stored in a message attribute table (NAT) at the transmitter and receiver, whereby the periodically recurring transmission time of the message distinctly identifies the associated NAT. Such an implementation saves overheads in the data communication. The information in the NATs can be protected by error-correcting codes, so as to be able to tolerate transient errors in the memory.

Figure 4:
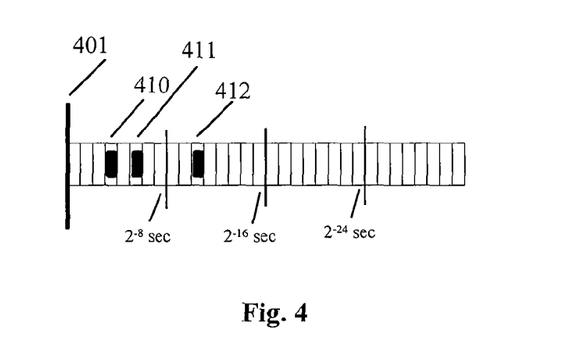
FIG. 4 shows the structure of the time representation in the network.

FIG. 4 shows the uniform time frame which is used in ZK 200 and the NKs 102. The basis for this uniform time frame is a chosen time unit 401. This frame is based on a binary division of the chosen time unit 401. With a restriction of the period choice to negative powers of two of the time unit (½, ¼, ⅛, . . . ) it is possible to specify the period duration by a single bit, the period bit 410, in this binary time frame. The phase of a period, that is, the deviation of the start of the period from the beginning of the period, can be defined by the bit sequence 411 and 412 on the right of the period bit 410. If the physical second is chosen as time unit 401, the possible periods are ½, ¼, ⅛, . . . seconds.

Figure 5:
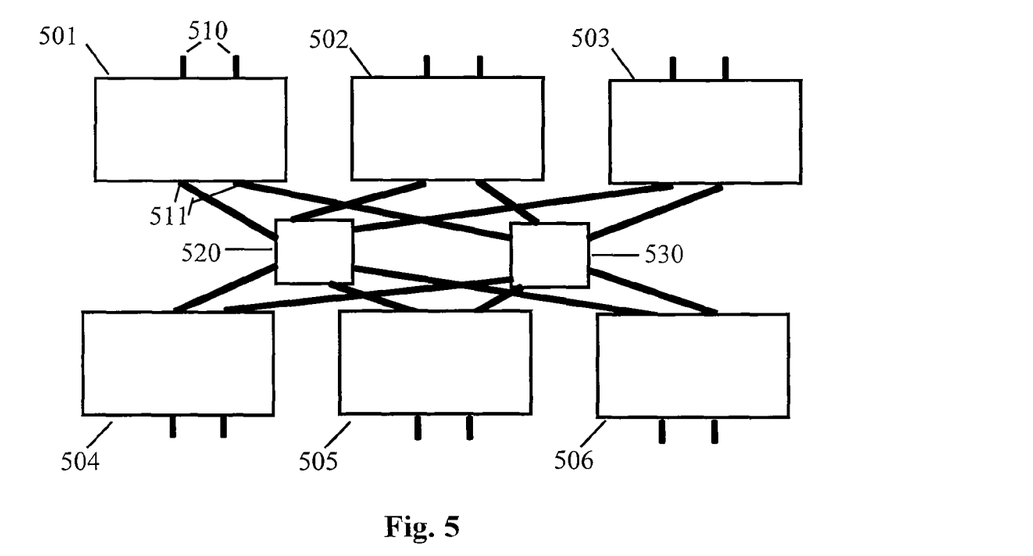
FIG. 5 shows the assembly of a cluster with six time-controlled SoCs which are connected to each other via two independent TT ethernet networks.

FIG. 5 shows a cluster with six SoCs 501, 502, 503, 504, 505 and 506. Each of these SoCs supports two connections 511 to two independent time-controlled off-chip networks 520 and 530. Each SoC additionally supports two connections 510 to local networks or to the local process periphery. The off-chip networks 520 and 530 can e.g. be controlled by the IT ethernet protocol [7]. It is then possible to use the time basis of the TT ethernet protocol as external time reference for the SoCs 501, 502, 503, 504, 505 and 506, so that the internal transmission times of all IP cores within an SoC are also synchronous with one another. It is then possible to transmit a sequence of messages from one IP core of a SoC, e.g. 501, to an IP core of another SoC, e.g. 505 with minimal latency and minimal jitter. The planning of such a real time transaction overlapping such an SoC can take place by a defined off-chip entity, e.g. the SoC 506 for all IP cores of all SoCs 501, 502, 503, 504, 505 and 506 of the cluster. It is also possible that the planning of such a real time transaction of an entity takes place outside the cluster depicted in FIG. 5. According to the invention, the data have to be transferred in a coded manner to the NKs 102 which define the transmission times of the NKs in the SoC. The two external networks 520 and 530 depicted in FIG. 5 realise an error-tolerant external communication system. Such an error-tolerant external time-controlled communication system on the basis ETHERNET has been disclosed in [7].

After the power-up of an SoC, the transmission parameters (transmission time and transmission duration) of the ports of the SoC are calculated by the TNA 226 of a SoC and are transferred to the NKs 102 of the IP cores of the SoC via the ZK 200 (FIG. 3) by means of privileged on-chip messages. According to the invention, it has to be ensured constructively that neither a non-privileged message nor the IVS 101 of an IP core can change these transmission data. Nevertheless, a reading of these transmission data by the IVS is possible. Each NK 102 intending to transmit a message starts to transmit the message autonomously exactly at the next set time of the next transmission time and interrupts the transmission process at the latest after the assigned maximum transmission duration has elapsed. The distinction between a privileged and a non-privileged message of the ZK takes place on the basis of the bit 331 in the control field of each ZK message. This distinction between a privileged and a non-privileged message can alternatively also take place on the basis of the physical name of the privileged transmission port of an IP core. It is also possible to carry out this distinction between a privileged and a non-privileged message on the basis of the periodic transmission time of the privileged transmission port of an IP core.

In addition to the physical name, each IP core also comprises a logical name. The physical name labels the physical identity of the IP core, while the logical name labels the function (role) of the IP core in the given application. The assignation of a logical name to an IP core also takes place exclusively via privileged messages of the NK.

The periods of the time-controlled messages in the ZK are powers of two of a smallest period, as shown in FIG. 3. The smallest period can be chosen in such a manner that a power of two corresponds exactly to the duration of a physical second. Each NK 102 can have a plurality of entry and exit ports to the ZK. Each port is assigned a distinct period by the TNA 226 with a distinct phase, whereby it is ensured by the TNA that a conflict between the different transmitters of the ZK will not be present at any time. If an IP core requires more transmission bandwidth, it can transmit the message to the TNA, so as to request the additional bandwidth. The TNA will then check if this requirement can be met, and assign the requested bandwidth (period, phase and maximum transmission duration) in the positive case via a privileged message. Each IVS 101 of an IP core can periodically transmit a vital sign message to the TNA 226 via its NK 102. If this vital sign message fails, the TNA can initiate the restart of the IVS 101 by means of a privileged message to the NK 102 of this IP core, or can initiate a reconfiguration of the software of the IVS. Within the scope of a reconfiguration, the logical name of the failed IP core is assigned to another physical IP core of the SoC by the TNA, and, if necessary, the necessary i-state [8, p. 76] of the IP core is loaded. The i-state is a static data structure which encompasses the entire software and the initialisation data of a programmable IP core.

The TNA 226 can carry out an integrated resource planning of the entire SoC. In this case, the timeliness and the energy consumption of the IP cores is considered in addition to the bandwidth assignation of the ZK. According to the invention, the TNA can influence the processing frequency and/or the voltage of the IVS by means of a privileged message to the NK 102, so as to optimise the energy consumption of an IP core. The distributed character of the SoC architecture introduced makes it possible for each IVS to drive its own processing frequency, independent of the processing frequency of the other IVSs or the frequency of the ZK.

We call a subsystem comprising a consistent time basis a clock domain. A clock domain crossing is realised in the NK, as the ZK and the IVS belong to different clock domains. The messages stored in the message buffer of the NK are stable between the transmission and reception times known a priori of the messages of the ZK and can be read or written by the IVS with the up-to-date frequency of the IVS. The clock domain crossing is thus carried out within the NK.

In a security-critical use, it is sensible to divide the integrated resource planning on two IP cores. A non-privileged IP core carries out the calculation of the integrated resource planning and transmits the result of this integrated resource planning to the TNA. The TNA 226 checks if the calculated resource planning corresponds to the given security requirements and transmits the checked results to the NKs 102 of the IP cores by means of privileged messages. As the checking if a scenario satisfies given security requirements is easier than the calculation of such a scenario, the complexity of the security-critical software of the TNA 226 can be reduced substantially by this separation. Thus, significant savings result with the certification of the software of security-critical systems.

According to the invention, the energy consumption of the ZK can be minimised by only sending messages from the NK 102 in the periods assigned by the TNA if the assigned IVS 101 has produced a new message. Thus, when no new message was provided by the IVS 101, the NK does not send a message.

It can possibly be necessary to configure the data transfer within the ZK in an error-tolerant manner by feed-forward error correction. For this purpose, the data of a ZK message (FIG. 3) have to be recoded in an error-correcting code. Alternatively, several independent communication networks can be realised within the ZK, so that one or several other networks are available during the outage of a network.

The economic use results from the following characteristics of this invention:

The deterministic on-chip network ensures that the communication between the IP cores of the SoC can be planned in the time region. This is a necessary precondition for the certification of security-critical software and for the realisation of the composability of the subsystems implemented on the IP cores.

In a security-critical application, the complexity of the security-critical software can be reduced substantially by the separation of the security-critical software in the TNA 226 from the non-security-critical to the integrated resource calculation in a non-privileged IP core. Thus, significant savings result with the certification of the software of security-critical systems The determinism of the on-chip network is a necessary prerequisite for the realisation of error-tolerant systems by means of TMR (triple modular redundancy).

The invention supports the extensive decoupling of the subsystems of an SoC and thereby leads to a significant reduction of the complexity.

The invention makes possible the minimising of the consequences of software errors of an IVS, as a faulty software of an IVS cannot influence the function of other independent IP cores of the SoC.

Literature cited:

[1] U.S. Pat. No. 5,694,542 issued on Dec. 12, 1989: A loosely coupled distributed computer system with node synchronization for precision in real time.

[2] EP 0 658 257 of Dec. 18, 1996: Communications control unit and information transmission process.

[3] U.S. Pat. No. 5,887,143 issued on Mar. 23, 1999: Time-Triggered Communication Control Unit and Communication.

[4] AT 407 582 of Jun. 15, 2000: Message distribution unit with integrated guardian for preventing babbling idiot errors.

[5] AT 408 383 of Jun. 15, 2005: Method and device for calibrating the clock course in a distributed real-time computer system.

[6] EP 1325414 of Apr. 21, 2004 Handling errors in an error-tolerant distributed computer system

[7] EP 1512254 B1 of Oct. 6, 2005, Communication system and method for transmitting timed and event-driven ethernet messages.

Kopetz, H. (1997). Real-Time Systems, Design Principles for Distributed Embedded Applications; ISBN: 0-7923-9894-7. Boston. Kluwer Academic Publishers.

[9] Takahashi, O. et. al., Power conscious design of the Cell's processors synergistic processor element, IEEE Micro, Vol. 25, No. 5, September-October 2005, pp. 10-18. While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A method comprising:
transferring messages via a time-controlled communication system between a plurality of IP cores including at least one privileged IP core and at least one unprivileged IP core, with each IP core having an information-processing subsystem and a network controller, with each network controller having at least two interfaces, an interface for the communication system and a second interface for the information-processing subsystem;
transmitting a privileged message including transmission parameters from the at least one privileged IP core to the at least one unprivileged IP core, the transmission parameters including a periodically recurring transmission time of a time-controlled message and a maximum transmission duration after each transmission time, that are set exclusively by the at least one privileged IP core to control a network controller of the at least one unprivileged core;
autonomously transmitting from each network controller a message exactly at the periodically recurring transmission time; and
interrupting the transmission process at a time no later than after the assigned maximum transmission duration has elapsed.

2. The method according to claim 1, further comprising forming the network controllers on a single system-on-chip and the communication system is formed as a network-on-chip.

3. The method according to claim 1, further comprising forming the network controller different chips and forming the communication system as an off-chip network.

4. The method according to claim 1, wherein the distinction between a privileged a non-privileged message of the communication system takes place based on a designated bit in the header of each communication system message.

5. The method according to claim 1, wherein the distinction between a privileged and a non-privileged message of the communication system takes place based on the periodic transmission time of the message.

6. The method according to claim 1, further comprising making a distinction between privileged and non-privileged transmission ports of the network controller of an IP core, and wherein a privileged message can only be sent via a privileged transmission port, where the distinction between a privileged and a non-privileged message takes place based on a physical name of the privileged transmission port.

7. The method according to claim 1, wherein each of the at least one privileged IP core and the at least one unprivileged IP core comprises a physical name which labels the physical identity of the at least one privileged IP core and the at least one unprivileged IP core, and further comprises one or more logical names which label the functions of the at least one privileged IP core and the at least one unprivileged IP core in the given use, and where the assignment of a logical name to an IP core can take place exclusively via a privileged message.

8. The method according to claim 1, wherein the information-processing subsystem of a non-privileged IP core can read the transmission parameters of its network controller, but not change them.

9. The method according to claim 1, wherein one of the privileged IP cores, known as a trusted network authority, contains a scheduler which dynamically calculates the transmission parameters of all IP cores connected to the communication system in such a manner that each transmission process can run free of conflict, and where the trusted network authority assigns the periodic transmission times and the transmission durations of all ports of the network controllers to the at least one privileged IP core and the at least one unprivileged IP core via privileged messages via the communication system.

10. The method according to claim 9, wherein the scheduler is removed from the trusted network authority in a security-critical system and is moved into another IP core and where the trusted network authority carries out the checking the transmission parameters calculated by the scheduler before these transmission parameters are transferred by means of privileged messages from the trusted network authority to the other IP cores.

11. The method according to claim 1, wherein the duration of the periods of the time-controlled messages in the communication system are powers of two of a smallest period.

12. method according to claim 11, wherein the period of the communication system corresponds exactly to the duration of a physical second.

13. The method according to claim 1, wherein several independent ports of an IP core are supplied via a single physical communication signal of the communication system in the time division method.

14. The method according to claim 1, wherein the calculation of the conflict-free transmission parameter is carried out within a time-controlled system-on-chip by an off-chip entity and that the results of this calculation are sent to the affected time-controlled system-on-chip via a data connection.

15. The method according to claim 14, wherein the data on the data connection between the off-chip entity and the affected system-on-chip are transferred in a coded manner.

16. The method according to claim 1, wherein each IP core can transmit a message via the communication system to the privileged IP core containing the scheduler, so as to request a change of the assigned transmission times and the assigned transmission durations.

17. The method according to claim 1, wherein one or more IP cores transmit a vital sign message to one or more of the privileged IP cores via the communication system.

18. The method according to claim 8, wherein the privileged IP core can initiate the restart of the affected non-privileged IP core by the network controller of the unprivileged IP core during the absence of the vital sign message via the communication system.

19. The method according to claim 1, wherein one of the privileged IP cores undertakes a reconfiguration of the system-on-chip during an outage of the vital sign message from an IP core, by assigning the role of the failed IP core to the network controller of another IP core via a privileged message of the communication system, and, when necessary, by transferring an i-state, for the fulfillment of the new role, to the another IP core.

20. The method according to claim 1, further comprising autonomously transmitting from the network controller a diagnostics message during the recognition of an error by the network controller.

21. The method according to claim 1, wherein the information-processing subsystem of an IP core is either a programmable computer including the user software, a Field Programmable Gate Array or a dedicated hardware unit.

22. The method according to claim 1, wherein the physical communication channel of the communication system recodes the transmission data in an error-correcting code, so that the transmission errors dominated by the error-correcting code are recognized and corrected by the receiver.

23. The method according to claim 1, wherein several independent ports of an IP core are supplied by means of one single physical communication channel of the communication system in the time division method.

24. The method according to claim 1, wherein the communication system comprises two or several independent physical transfer channels, so that one or several independent transfer channels are available during an outage of one transfer channel.

25. The method according to claim 9, wherein the dynamic scheduler optimizes the schedules while considering the necessary time behavior of the at least one privileged IP core and the at least one unprivileged IP core and the optimal energy consumption of the entire system-on-chip.

26. The method according to claim 1, wherein the clock frequency of the communication system and the operating frequency of each individual IP core are different.

27. The method according to claim 1, wherein the operating frequency of an information-processing subsystem of an IP core, selected from one of i) the at least one privileged IP core and ii) the at least one unprivileged IP core, can be changed dynamically by the scheduler via a privileged message of the communication system to the network controller of the selected IP core, so as to ensure the timeliness of the results of the selected IP core and to optimize the energy consumption of the system-on-chip.

28. The method according to claim 1 further comprising, noting in a designated bit in the header of each communication system message if the message is a periodic or sporadic time-controlled message, and wherein the periodic messages are transmitted in each assigned period, and sporadic messages are only sent if the content of the message has changed since the last transmission process.

29. The method according to claim 1, wherein the information-processing subsystem comprises a further local interface in addition to the interface to the network controller, via which a connection to an off-chip network is realized.

30. The method according to claim 1, wherein the information-processing subsystem comprises a further local interface in addition to the interface to the network controller, which supports a connection to another system-on-chip corresponding to a Time Triggered Ethernet protocol.

31. The method according to claim 1, wherein the global time of the Time Triggered Ethernet protocol is consulted as a time reference for the external synchronization of the communication system.

32. The method according to claim 9, wherein the information-processing subsystem comprises a further local interface in addition to the interface to the network controller, which supports a connection to another system-on-chip corresponding to the Time Triggered Ethernet protocol, and the schedule calculated the scheduler is adjusted with the schedule of the Time Triggered Ethernet in such a manner that a continuous data stream can flow with minimal latency from one IP core of this system-on-chip to another IP core of another system-on-chip.

33. The method according to claim 32, wherein one system-on-chip supports several ports with the Time Triggered Ethernet protocol, so as to tolerate the outage of a port or an external network.

34. The method according to claim 1, wherein it is ensured by cryptographic methods that the transmission times in the network controllers can only be set or changed via coded messages by the at least one privileged IP core authorized therefore.

35. A system-on-chip comprising at least one of a programmable computer and a Field Programmable Gate Array for carrying out a method comprising:
transferring messages via a time-controlled communication system between a plurality of IP cores including at least one privileged IP core and at least one unprivileged IP core, with each IP core having an information-processing subsystem and a network controller, with each network controller having at least two interfaces, an interface for the communication system and a second interface for the information-processing subsystem;
transmitting a privileged message including transmission parameters from the at least one privileged IP core to the at least one unprivileged IP core, the transmission parameters including a periodically recurring transmission time of a time-controlled message and a maximum transmission duration after each transmission time, that are set
exclusively by the at least one privileged IP core to control an network controller of the at least one unprivileged core;
autonomously transmitting from each network controller a message exactly at the periodically recurring transmission time; and interrupting the transmission process at a time no later than after the assigned maximum transmission duration has elapsed.

36. A system-on-chip comprising:
at least one of a programmable computer and a Field Programmable Gate Array, on which are connected a plurality of IP cores including at least one privileged IP core and at least one unprivileged IP core via a time-controlled communication system, each IP core having an information processing subsystem and a network controller for interfacing with the communication system and the information-processing subsystem,
wherein the privileged IP core transmits a privileged message including transmission parameters to the at least one unprivileged IP core, the transmission parameters being exclusively set by the privileged IP core for controlling the network controller of the at least one unprivileged IP core, and
wherein the time-controlled communication system and the at least one privileged IP core and the at least one unprivileged IP core belong to different clock domains and that clock domain crossing respectively within one network controller assigned to a respective one of the at least one privileged IP core and the at least one unprivileged IP core is carried out such that the information-processing subsystem of the at least one privileged IP core and the at least one unprivileged IP core accesses between the message transfer by the communication system to the message buffers present in the network controller in a reading or writing manner within the a priori known stability intervals.

37. The system-on-chip according to claim 36, wherein several independent ports of an IP core are supplied via a single physical communication channel of the communication system in the time division method.

38. The system-on-chip according to claim 37, wherein the calculation of conflict-free transmission parameters is carried out by an off-chip entity within a time-controlled system-on-chip and that the results of this calculation are transmitted to the affected time-controlled system-on-chip via a data connection.

39. The system-on-chip according to claim 38, wherein the data on the data connection between the off-chip entity and the affected system-on-chip are transmitted in a coded manner.

40. The system-on-chip according to claim 36, wherein each IP core can transmit a message via the communication system to the privileged IP core which contains the scheduler, so as to request a change of the assigned transmission times and the assigned transmission durations.

\* \* \* \* \*